(No Model.)
N. PICOT.
DAMPER FOR STOVES AND FURNACES.
No. 249,985. Patented Nov. 22, 1881.
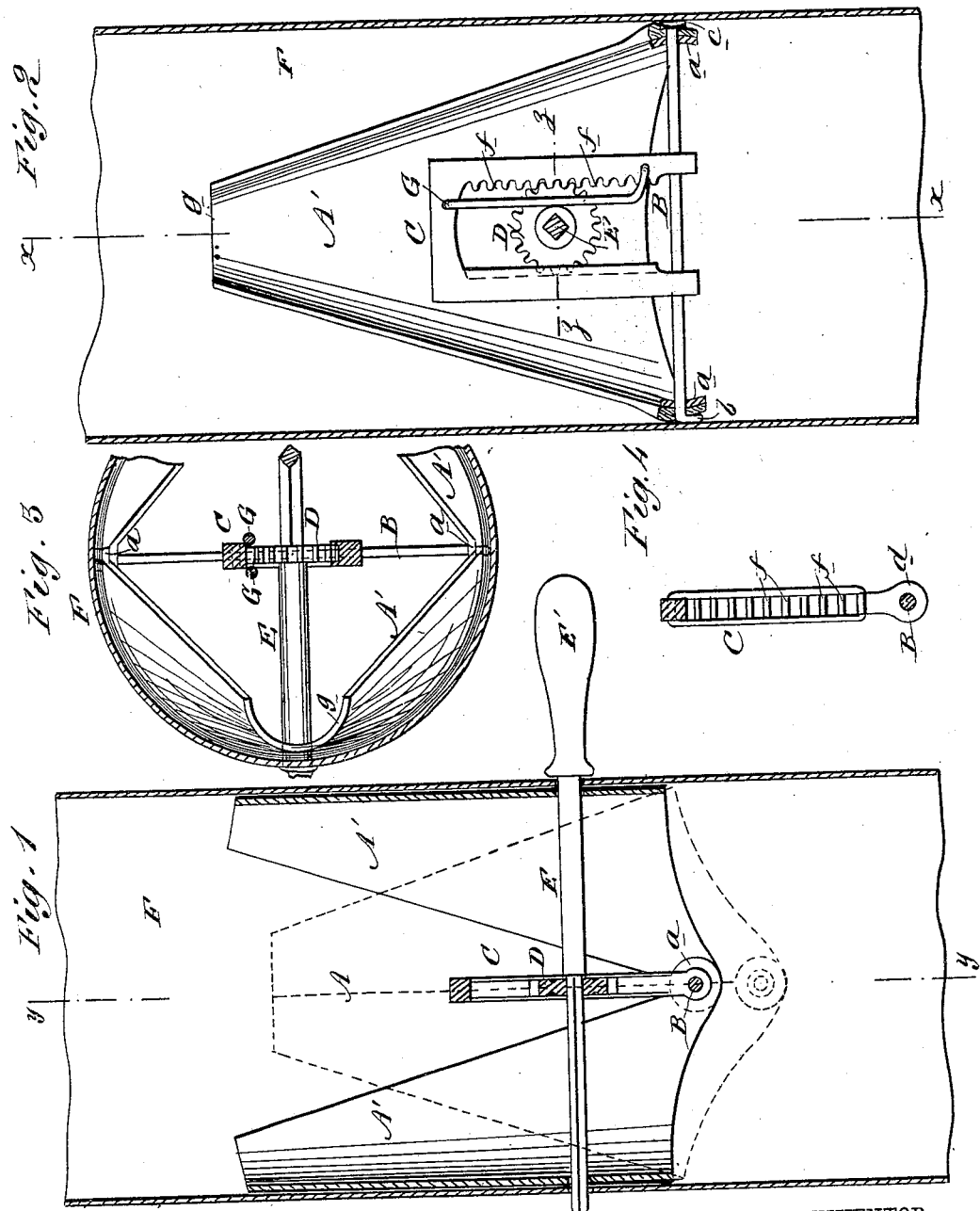
WITNESSES:
C. Neveux
C. Sedgwick
INVENTOR:
N. Picot
BY Munn & Co
ATTORNEYS.

UNITED STATES PATENT OFFICE.

NATHAN PICOT, OF ROCHESTER, NEW YORK.

DAMPER FOR STOVES AND FURNACES.

SPECIFICATION forming part of Letters Patent No. 249,985, dated November 22, 1881.

Application filed May 31, 1881. (No model.)

*To all whom it may concern:*

Be it known that I, NATHAN PICOT, of Rochester, in the county of Monroe and State of New York, have invented a new and Improved Damper for Stoves and Furnaces, of which the following is a full, clear, and exact description.

The invention consists in certain peculiarities of construction and arrangement, as hereinafter set forth.

In the accompanying drawings, Figure 1 is a sectional elevation on line $x$ $x$, Fig. 2, of the damper open and fixed in a stove-pipe. Fig. 2 is a sectional elevation of the damper in place on line $y$ $y$, Fig. 1. Fig. 3 is a partly-sectional plan of the damper open on line $z$ $z$, Fig. 2. Fig. 4 is a sectional elevation of the rack on line $x$ $x$, Fig. 2.

Similar letters of reference indicate corresponding parts.

In the drawings, A represents the damper, in form of a truncated cone, made in two parts, A' A', provided at their lower corners with perforated ears $a a$, the ears $a$ on one part overlapping the ears $a$ on the other part, through which a rod, B, is passed to hold the parts together, one end of said rod B being bent down, as shown at $b$, outside of the ears $a$, and the other end thereof being provided with a thin head or washer, $c$, outside of the ears $a$, to hold the said damper-sections A' A' and rod B in place together. Said ears $a a$ are bent inward, so that the bent end and the head or washer of the rod B shall not be extended beyond the lower rim of the damper A, which rim is designed to fit closely against the inner face of the stove-pipe F, as shown in the drawings.

Set about centrally in the damper A is the rack C, consisting of an open rectangular frame held in an upright position, and having the rod B pass through the perforations $d$ in its lower end.

On the inner edge of one side of this rack C are the teeth $f f$, with which the pinion D engages, which pinion D is set between the sides of said rack C, firmly secured on a shaft, E, which extends transversely through both damper-sections, and also through the stove-pipe F, a handle, E', being fixed on an end of said shaft E for convenience of the operator in regulating or adjusting said damper A.

A guide-rod, G, secured in one side of the rack C near its bottom, and extending upward nearly to its top on both sides thereof, serves to prevent the disengagement of the pinion D from the rack C.

The damper A being set in a stove-pipe, F, as shown, and the handle and shaft E' E being turned in one direction, the pinion D, engaging in the rack C, thereby elevates the latter, as shown in Figs. 1 and 2, whereby the base of the damper A is elevated by the upward pull of the rack on the rod B and its sections thrown apart against and parallel with the stove-pipe F, as shown in Figs. 1 and 3, so that little obstruction is offered to the passage up the stove-pipe F of the products of combustion from the stove, while the opening through the damper A being central, and the opening or diameter of the stove-pipe F being reduced by said damper, the draft is thereby quickened, and the fire in the stove thereby made to burn more freely. On turning the handle and shaft E' E in the contrary direction, the pinion D forces down the rack C and rod B, the ends of the latter bearing against opposite sides of the inside of the stove-pipe F, and thereby closes the damper A, as shown in dotted lines, Fig. 1, still leaving, however, a small central orifice, $g$, at its apex for the gradual escape of the products of combustion from the stove. (Not shown.)

I am aware that a damper composed of two conical sections hinged together is not broadly new.

Having thus described my invention, what I claim as new, and desire to secure by Letters Patent, is—

In a stove-pipe damper, the combination, with the cone-sections A' A', of the rod B, rack C, consisting of an open rectangular frame having perforations $d d$ in its lower end, pinion D, set between the sides of said rack, shaft E, and the guide-rod G, secured to said rack and extending upward nearly to its top on both sides thereof, substantially as herein shown and described.

NATHAN PICOT.

Witnesses:
GODFREY S. NEFF,
WILLIAM C. PIKE.